(12) United States Patent
Uhlinger

(10) Patent No.: US 6,190,556 B1
(45) Date of Patent: Feb. 20, 2001

(54) DESALINATION METHOD AND APPARATUS UTILIZING NANOFILTRATION AND REVERSE OSMOSIS MEMBRANES

(76) Inventor: Robert A. Uhlinger, 6551 Corte Cisco, Carlsbad, CA (US) 92009

( * ) Notice: Under 35 U.S.C. 154(b), the term of this patent shall be extended for 0 days.

(21) Appl. No.: 09/170,142

(22) Filed: Oct. 12, 1998

(51) Int. Cl.[7] .............................. B01D 61/12; B01D 61/08
(52) U.S. Cl. ....................... 210/636; 210/641; 210/651; 210/652; 210/195.2; 210/321.64; 210/134
(58) Field of Search ................................. 210/321.64, 636, 210/641, 321.69, 195.2, 257.2, 260, 196, 100, 102, 134, 258, 321.66, 651, 652

(56) References Cited

U.S. PATENT DOCUMENTS

| | | |
|---|---|---|
| 3,654,148 | 4/1972 | Bradley . |
| 4,046,685 | 9/1977 | Bray . |
| 4,156,645 | 5/1979 | Bray . |
| 4,169,789 | 10/1979 | Lerat . |
| 4,341,629 | 7/1982 | Uhlinger . |
| 4,723,603 | 2/1988 | Plummer . |
| 4,973,408 | * 11/1990 | Keefer ................................. 210/652 |
| 5,098,575 | 3/1992 | Yaeli . |
| 5,238,574 | 8/1993 | Kawashima et al. . |
| 5,458,781 | 10/1995 | Lin . |

* cited by examiner

*Primary Examiner*—W. L. Walker
*Assistant Examiner*—Richard W. Ward
(74) *Attorney, Agent, or Firm*—Fitch, Even, Tabin & Flannery

(57) ABSTRACT

Apparatus and methods for producing potable water from an aqueous feed such as seawater utilizing a pressure vessel designed for operation in the range of about 250 psig to about 350 psig having reverse osmosis (RO) separation elements disposed upstream of at least one nanofiltrate separation element. The supply of seawater at such pressure creates no permeate flow through the RO membranes, so the seawater flushes the feed side of the RO elements on its way to the NF element where very substantial permeate flux occurs, producing a NF permeate substantially depleted in divalent ions and optionally moderately depleted in monovalent ions. The NF permeate is collected in a holding tank having liquid level switches, and when a desired level is reached, a control system causes the pump to draw suction from the holding tank while shutting off feed from the seawater source. When the NF permeate is supplied to the feed side of the RO elements, its osmotic pressure is such that substantial RO permeation now occurs creating a stream of good quality potable water. During both stages of operation, energy is conserved by routing the concentrate stream leaving the pressure vessel through an energy recovery device that boosts the pressure of the liquid being discharged from the positive displacement pump.

17 Claims, 2 Drawing Sheets

DESALINATION METHOD AND APPARATUS UTILIZING NANOFILTRATION AND REVERSE OSMOSIS MEMBRANES

FIELD OF INVENTION

This invention relates to desalination of an aqueous feed containing significant concentrations of monovalent and divalent ions. More particularly, the invention relates to methods and apparatus for the desalinization of sea water using a combination of reverse osmosis and nanofiltration, and still more particularly to methods and apparatus for the efficient and economical desalinization of sea water at relatively low pressures.

BACKGROUND OF THE INVENTION

The use of conventional reverse osmosis (RO) technology for seawater desalination is neither new nor novel. Such technology has been demonstrated commercially both in the United States and elsewhere for over two decades. Several U.S. Government agencies were originally responsible for much of the early research funding in membrane desalination, with the result that many U.S. companies are now among the leaders in the production of membranes for desalination, both for seawater and brackish waters.

However, the high capital and operating costs of RO desalination of seawater have limited its application to situations where special circumstances justify its use. These circumstances generally amount to situations where there are limited alternatives for fresh water supply, such as shipboard desalting, or unusual economic situations such as in the Middle East where there is an abundance of low cost energy.

The reason for the wide-scale lack of acceptance of seawater desalting is basically economic; seawater desalting is expensive. The high cost for RO desalting is a function of its high capital cost and high operating cost. The capital costs are high for conventional seawater RO because of the high pressures which are used, typically 800 psi to 1200 psi, requiring high pressure pumping and piping systems which are costly. The high cost of exotic, corrosion-resistant materials, such as special alloy or stainless steels, which are generally used for most components, such as piping, valves, pumps, etc., and the need to use expensive membranes also increases the cost of seawater RO systems. Additionally, the design flux rates (e.g. gallons of permeate produced per square foot or square meter of effective membrane area) are typically quite low for commercial seawater RO membranes, requiring installations to have extended membrane-surface areas.

Seawater RO membranes are the "tightest" of the membranes used, which means that the rejection of salts is high but the flux of water is low in comparison to brackish water or nanofiltration membranes. When salt passage is low, as it is for such seawater RO membranes, single stage treatment will allow one to obtain potable quality water, i.e. less than about 500 ppm total dissolved solids (TDS), from seawater. However, the low specific water flux of such tight membranes, measured in GFD/psi (gallons of permeate per square foot of membrane area per day, per psi of net driving pressure) requires a large amount of effective membrane area and a high operating pressure to obtain adequate quantities of water.

The high operating pressure generally used in conventional seawater RO is thus a consequence of both (a) the inherently low specific flux of most seawater membranes and (b) the high osmotic pressure of seawater, which is typically about 360 psig for standard seawater having about 35,000 ppm. The combination of these design parameters has generally resulted in operating conventional seawater RO installations at a pressure in the range of about 800–1200 psi, with consequent high operating costs. Conversely, nanofiltration (NF) membranes operate at significantly lower pressures than RO membranes and have inherently high flux rates, typically 5–6 times higher than those for seawater RO membranes (0.11 GFD/psi vs. 0.02 GFD/psi).

The driving force for permeation for membrane separation is the net pressure across the membrane; this is defined as the feed pressure minus the permeate or back pressure, less the difference between the osmotic pressure of the feed and the osmotic pressure of the permeate. Because NF membranes allow high salt passage for monovalent ions, the osmotic pressure of the permeate is significant; this allows these membranes to partially desalt seawater while operating at pressure below the actual osmotic pressure of the feed.

U.S. Pat. No. 4,723,603 employs NF membranes for specific removal of sulfate from seawater. Sulfates are removed exceptionally well by NF membranes, and the NF permeate, still relatively rich in sodium chloride but deficient in sulfate, is used to formulate drilling mud on offshore drilling rigs. Such sulfate-free water prevents the formation of barium sulfate which has extremely low solubility and can cause clogging.

U.S. Pat. No. 4,156,645 to Bray proposes to recover fresh water from seawater by a two-stage operation using a first stage with a "loose semipermeable membrane" to produce a water product containing 25 to 50% of the TDS of seawater, which permeate is treated in a subsequent stage using a "tight" semipermeable membrane at pressure between about 300 and 500 psi and results in a product having a TDS of less than 2,000 ppm.

My earlier U.S. Pat. No. 4,341,629 proposes to desalinate seawater by using two RO modules which can include the same membrane, e.g. a 90% rejection cellulose triacetate (CTA) RO membrane, or two different membranes, e.g. an 80% rejection CTA membrane and a 98% rejection CTA membrane.

U.S. Pat. No. 5,238,574 also shows the use of a multiplicity of RO membrane modules to separate seawater into potable water. For example, a first low-pressure RO membrane may be followed by a high pressure RO membrane, or a series of low pressure RO membranes can be used, to either provide permeate of varying water quality or simply to produce a combined permeate where the concentrate stream from one module becomes the feedstream for the next module in series. A generally similar arrangement is shown in U.S. Pat. No. 4,046,685 wherein the permeate streams are not combined; a higher quality water permeate stream is withdrawn separately from the first RO cartridge in series while the combined permeate streams from the next two RO cartridges in series are combined to produce a lower quality water product.

U.S. Pat. No. 5,458,781 discloses the production of a feedstream for the recovery of elemental bromine or alternatively for the production of metal bromide salt. Disclosed in Example 1 is the treatment of a brine source containing about 13,000 milligrams per liter of TDS which produces a desired RO concentrate or retentate, that is then treated in Example 2 with an NF membrane to produce an NF permeate which is high in bromide content and low in sulfate. In Example 3, the feedstream originally treated in Example 1 is instead treated using a nanofiltration module to very substantially increase the concentration of bromide and very substantially decrease the concentration of sulfate.

Although the methods and apparatus shown in the aforementioned U.S. patents may have had advantages in some particular instances, they have not proved to be a solution to the problem of how to efficiently and economically produce potable water from seawater. Thus, the search has continued for semipermeable membrane systems which can be used to produce potable water from seawater.

SUMMARY OF THE INVENTION

The invention provides methods and apparatus for efficiently and economically producing potable water. The efficiency and economy results from the combination of a relatively low pressure pump which delivers a feedstream to a single pressure vessel; RO and NF separation elements are both contained in this single pressure vessel, with an intermediate collection or holding tank being used to collect the permeate from a first pass through the pressure vessel, which collected permeate is later returned for a second pass that produces potable water—all at relatively low pressures. From one particular standpoint, such a use of NF membrane elements in combination with these newly available, "energy-efficient" RO membrane elements to desalinate seawater in two steps or passes makes it possible to efficiently produce potable water at operating pressures less than the osmotic pressure of seawater.

In one aspect, the invention provides an apparatus for producing potable water from an aqueous feed containing high concentrations of monovalent and divalent ions, which apparatus comprises (a) a pressure vessel having inlet and outlet ends and containing at least one NF element which selectively rejects divalent ions, and at least one RO element which rejects a high percentage of monovalent and divalent ions, (b) a pump for delivering the aqueous feed at a desired pressure to the inlet end of this pressure vessel, (c) means connecting such pump to a source of such aqueous feed so as to cause flow thereof through this pressure vessel, whereby the NF element separates said aqueous feed into a first concentrate stream and an NF permeate stream which is substantially reduced in divalent ion content, (d) an intermediate liquid storage tank, (e) means for directing such NF permeate stream to this intermediate storage tank, and (f) means for (i) interrupting the flow of such aqueous feed from the source; (ii) connecting such pump so as to draw NF permeate from such intermediate storage tank and pump NF permeate back through this pressure vessel, and (iii) blocking permeate flow through the NF element, so that such pumped flow of NF permeate from the intermediate storage tank through such pressure vessel flushes the NF element and results in the RO element separating the NF permeate into a potable water permeate stream and a second concentrate stream.

In another aspect, the invention provides a method of desalinating an aqueous feed comprising the steps of (a) locating a RO element and a NF element for series flow in a single pressure vessel having an inlet and a concentrate outlet, (b) pumping an aqueous feed containing monovalent ions and divalent ions in series flow through the RO and NF elements in such pressure vessel at a pressure which is below the osmotic pressure of seawater so that substantially no permeation occurs through the RO membrane element, but which pressure is such that the NF element creates a first concentrate stream and a NF permeate stream having a substantially reduced concentration of divalent ions and an optionally reduced concentration of monovalent ions; collecting and temporarily storing the NF permeate stream; and interrupting pumping the aqueous feed and instead pumping the temporarily stored NF permeate through the pressure vessel inlet at a pressure above the osmotic pressure of the NF permeate to cause permeation to occur through the reverse osmosis element which creates an RO permeate stream of potable water and a second concentrate stream.

In a further aspect, the invention provides a method of desalinating seawater comprising the steps of locating a reverse osmosis element upstream of a nanofiltration element for series flow in a single pressure vessel having an inlet and a concentrate outlet; pumping a seawater feed containing monovalent ions and divalent ions in series flow through the reverse osmosis element and then through the nanofiltration element in such pressure vessel at a pressure which is below the osmotic pressure of seawater so that substantially no permeation occurs through the RO membrane element, but which is such that the NF element creates a first concentrate stream and a NF permeate stream having a substantially reduced concentration of divalent ions and a moderately reduced concentration of monovalent ions; collecting and temporarily storing the NF permeate stream; and interrupting pumping of the seawater feed and instead pumping the temporarily stored NF permeate through such pressure vessel inlet at a pressure above the osmotic pressure of the NF permeate to cause permeation through the reverse osmosis element to occur which creates an RO permeate stream of potable water and a second concentrate stream that flushes the feed side of the nanofiltration element.

More specifically, an RO separation element designed for the production of a relatively high flux when operating on a brackish water feed is combined with a NF membrane element within the same pressure vessel so that liquid flow pumped through the pressure vessel traverses both elements. A first pass through the pressure vessel is carried out at a pressure less than the osmotic pressure of seawater so there is essentially no permeation occurring in the RO element, as a result of which the full volume of the stream reaches the NF element and results in the creation of a NF permeate stream which is preferably highly reduced in its divalent ion content and moderately reduced in its monovalent ion content, compared to the seawater feed.

Commercially available nanofiltration elements can reasonably reduce the salinity of normal seawater to about 10,000–15,000 ppm when operated at a feed pressure of about 350 psig or below. Such an aqueous solution has a very substantially lower osmotic pressure. There are now commercially available RO membranes that are designed to provide high flux when treating brackish water which, when supplied with an aqueous feed having the characteristics of this NF permeate, will produce potable water at a relatively low pump pressure; this allows the same pump to be used to supply the aqueous feed to the pressure vessel containing the two separation elements during both pumping steps. Because there is essentially no permeate flow through the RO membrane during the first step and because the majority of the scale-forming and potentially fouling contaminants exit as a part of the first concentrate stream and are thus no longer present in the NF permeate, the design flux of the RO element can be several times greater than the design flux of a conventional seawater RO element where scaling and fouling are always an important design consideration. Because it is possible to carry out both steps at a pump pressure not greater than about 350 psig, the need for expensive pumps and piping arrangements and expensive seawater RO membranes is obviated, resulting in savings in both capital costs and operating costs.

DETAILED DESCRIPTION OF PREFERRED EMBODIMENTS

Figure 1:
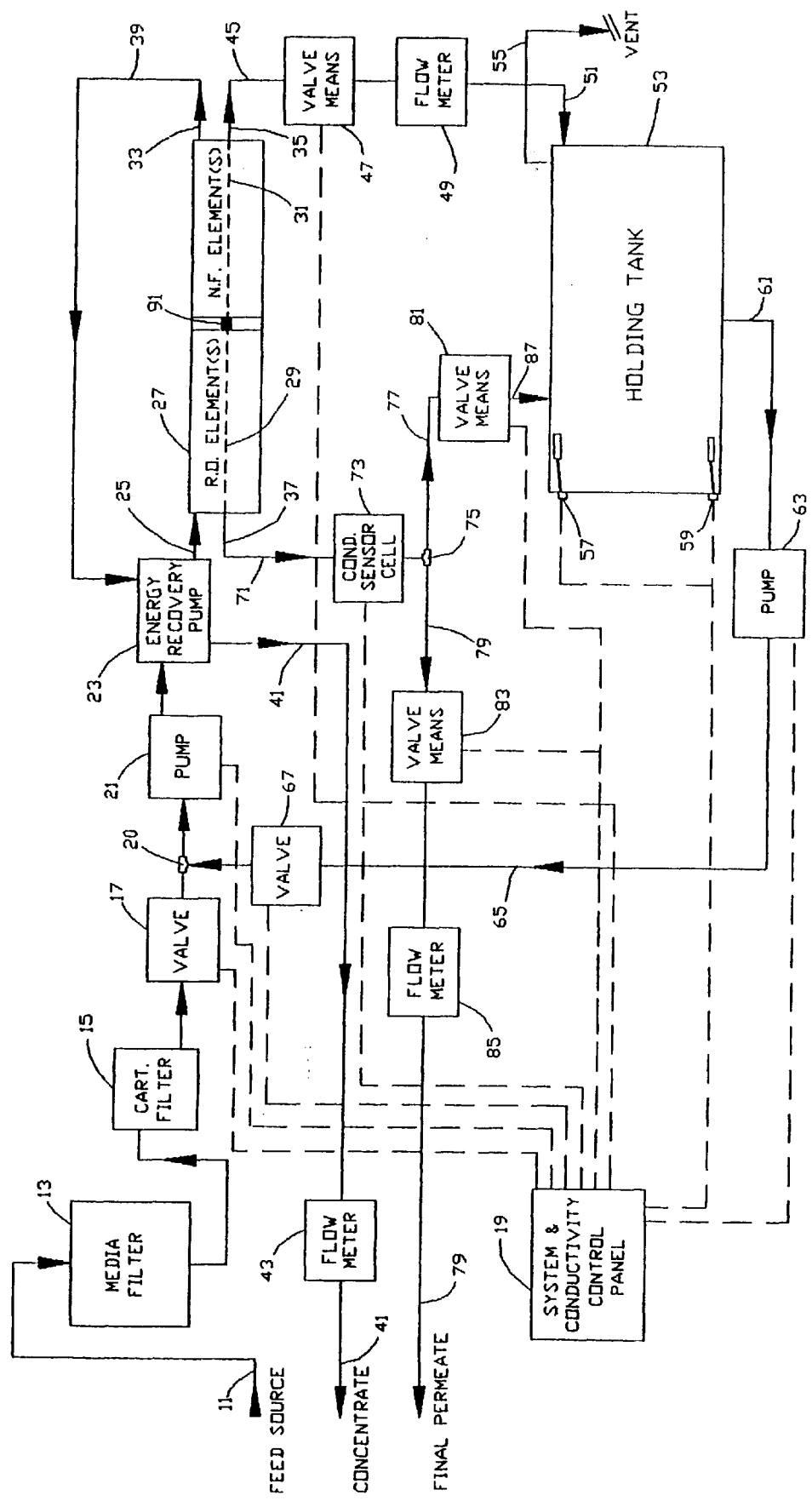
FIG. 1 is a diagrammatic view showing a preferred embodiment of a seawater desalination system embodying various features of the invention.

Very generally, the system depicted in FIG. 1 utilizes a single pressure vessel within which at least one RO separation element and at least one NF element are located, with the NF element preferably being located downstream of the RO element, as a result of which all or at least a very significant portion of a liquid feedstream being supplied under pressure to the pressure vessel inlet will flow through, i.e. axially traverse, both separation elements. As explained in more detail hereinafter, as a part of a first stage or step, an aqueous feed, e.g. seawater, is supplied at a pressure not greater than about 350 psig. The precise pressure may be adjusted according to the character of the aqueous feed and the character of the RO membrane so that there will be substantially no permeate flow occurring in the RO element. Thus, the entire volume of the feed stream reaches the NF element where a substantial permeate flow occurs, which is collected and temporarily stored in a holding tank. Pumping of the aqueous feed, e.g. seawater, is intermittently interrupted, and the same pump is used to alternately withdraw the NF permeate from the holding tank and supply it under similar pressure to the pressure vessel after a valve in the NF permeate line has been closed to prevent any NF permeate flow during this second stage alternate pumping step. As a result of such pumping of the NF permeate through the pressure vessel, a high flux of potable water permeates through the RO element, while the concentrate exiting from the RO element flushes and scrubs the feed side of the NF element. As these two pumping steps are alternately repeated, during each first pumping step, the feed side of the RO element is flushed with the entire volume of the aqueous stream. By appropriate selection of commercially available RO and NF elements, efficient and economical production of potable water from an aqueous feed, such as seawater, having substantial quantities of both monovalent and divalent ions can be achieved at low to moderate operating pressures.

Diagrammatically illustrated in FIG. 1 is a system embodying various features of a preferred embodiment of an installation which demonstrates the efficient and economical production of potable water from an aqueous feed source 11, such as seawater from the ocean. Alternatively, any saline water source having substantial concentrations of divalent and monovalent ions would be a potential candidate for desalination by use of the illustrated system. As one example, raw seawater may be taken from the ocean, either from a sea well or from an open intake, and initially subjected to conventional filtration using a large particle strainer (not shown), followed by to multi-media filters 13, which might be typically sand and/or anthracite coal, followed by suitable cartridge filtration 15. The prefiltered feed water then reaches a first control valve 17 which is automatically actuated via a control system or panel 19. When the valve 17 is open, the feed water source flows through a tee 20 to the intake to a pump 21, which is a commercially available, high efficiency feed pump of any suitable design that is typically designed to produce an outlet pressure of about 200–300 psig. A reciprocating piston positive displacement pump is preferred, such as one of those commercially available from FMC.

The outlet stream from the pump 21 enters an energy recovery pump 23 or booster which may be of the coupled turbine design commercially available from the PEI Company. The pump 23 utilizes the pressure of the concentrate stream, that is being returned to the ocean or other source at atmospheric pressure, to boost the pressure of the pumped feed water stream, thus conserving energy. The aqueous stream leaving the energy recovery pump preferably has its pressure boosted to about 250 to 350 psig before it enters an inlet 25 leading to a single pressure vessel 27 which is illustrated in more detail in FIG. 2. For example, this could be an 8-inch diameter, fiberglass reinforced, epoxy resin pressure vessel having a full bore opening at one or both ends through which right circular cylindrical separation cartridges can be inserted, as for example of the general type illustrated in U.S. Pat. No. 5,720,411, issued Feb. 24, 1998, the disclosure of which is incorporated herein by reference. Installed within the pressure vessel 27 are one or more RO elements 29 and, downstream thereof, one or more NF elements 31.

The pressure vessel has a single concentrate outlet 33 but has separate NF permeate and RO permeate outlets 35 and 37. The concentrate stream exiting the pressure vessel via the concentrate outlet 33 flows through a line 39 which leads back to the input side of the energy recovery pump 23, exiting via a discharge line 41 containing a flowmeter 43 which leads to the ocean or to any other appropriate location. The NF permeate outlet 35 is connected to a line 45 containing a valve 47, which is also controlled by the control panel 19, and a flowmeter 49, which in turn connects to an inlet 51 to an intermediate liquid storage or holding tank 53 The tank 53 is provided with a vent 55 and a pair of upper and lower liquid level sensors 57, 59 that are suitably connected to the control panel 19. A lower outlet line 61 from the holding tank 53 leads to an auxiliary pump 63 which is also controlled by the control panel 19. The pump 63 discharges through a line 65 containing a valve 67 leading the tee 20 in the inlet line to the main pump 21. The valve 67 is likewise controlled by the control panel 19, and if desired, the valves 17 and 67 and the tee 20 can be combined by using instead a commercially available three-way valve.

The outlet 37 for the RO permeate from the pressure vessel is connected to a line 71 which contains a conductivity sensor 73 and connects to a tee 75 where the line 71 joins two branch conduits 77 and 79. The branch 77 leads back to the holding tank 53 via a valve 81 that is also controlled by the control panel 19. The branch 79 contains a valve 83 and a flowmeter 85 and carries the final potable water product, with the valve 83 being linked to the control panel 19.

Figure 2:
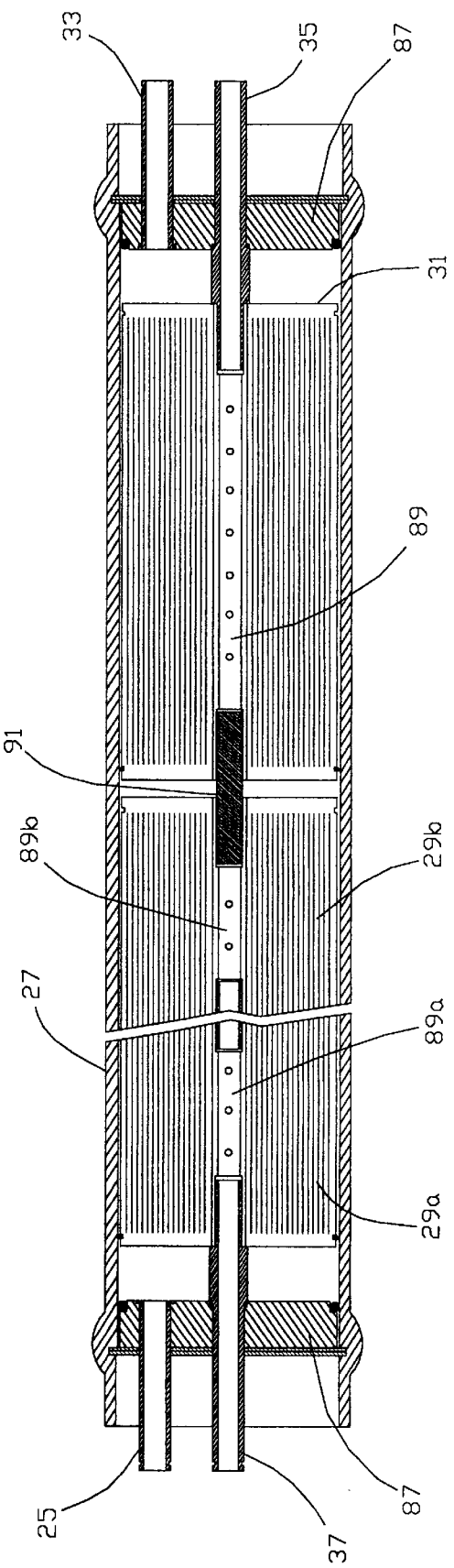
FIG. 2 is a schematic cross-sectional view through a pressure vessel showing a pair of spirally-wound separation elements that might be used in the system illustrated in FIG. 1.

As indicated above, the pressure vessel 27 can include one or a plurality of RO cartridges which are preferably located upstream of one or a plurality of NF cartridges. For purposes of simplicity, FIG. 2 is intended to show two RO cartridges 29a and b and a single NF cartridge 31, with the two RO cartridges having their permeate collection tubes connected in series as is well known in this art, see for example U.S. Pat. No. 3,928,204. Both the RO cartridge 29 and the NF cartridge 31 are diagrammatically illustrated as spirally wound semipermeable membrane cartridges. Because such spirally wound semipermeable membrane cartridges are widely commercially available, cartridges of this type are preferred; however, alternative designs of separation cartridges may also be used, such as cartridges made using hollow fiber technology having suitable membrane characteristics. For example, E. I. DuPont sells RO cartridges of hollow fine fiber (HFF) type, which are marketed by DuPont as their HFF B-9 cartridges and which may be used. As previously indicated, the pressure vessel 27 has a feed water inlet 25 and a concentrate outlet 33 which are supported in standard end closures 87 that are of conventional design and seal the respective ends of the pressure vessel 27. The end closures also carry the axially located NF permeate outlet 35 and the RO permeate outlet 37.

A typical spirally wound semipermeable membrane cartridge includes a plurality of leaves which are individual envelopes of sheet-like semipermeable membrane material that sandwich therebetween a layer of porous permeate carrying material, such as polyester fibrous sheet material. The semipermeable membrane material may be any of those commercially available materials, and preferred semipermeable materials are discussed hereinafter. Interleaved between adjacent leaves are lengths of spacer material, as well known in the art, which may be woven or other open mesh, screen-like crosswise designs of synthetic filaments, e.g. cross-extruded filaments of polypropylene or the like such as those sold under the trade names Vexar and Nalle, that provide flow passageways for the feed water being pumped from end to end through the pressure vessel. An appropriate lay-up of such alternating leaves and spacer sheets is then spirally wound about a hollow tube having a porous sidewall to create a right circular cylindrical cartridge. Depicted in FIG. 2 are such hollow tubes 89a and 89b for the RO cartridges and 89c for the NF cartridge.

One standard spirally wound separation cartridge is shown in U.S. Pat. No. 4,842,736, the disclosure of which is incorporated herein by reference, and provides a plurality of spiral feed passageways which extend axially from end to end of the ultimate cartridge, through which passageways the feed liquid being treated flows in an axial direction. Internally within the membrane envelopes, the permeating liquid flows along a spiral path inward in a carrier material until it reaches the porous central tube where it collects and through which it then flows axially to the outlet. As can be seen in FIG. 2, the outlet tube 37 has an interior spigot section that interconnects with the left-hand end of the central tube 89a of the RO element and is sealed thereto. Similarly, the interior end of the outlet tube 35 at the right-hand end of the pressure vessel is interconnected in sealing relationship with the hollow tube 89c of the NF cartridge 31. To coaxially align the adjacent RO and NF cartridges and plug the inner ends of the permeate tubes 89b and 89c, a two-ended plug 91 is provided which is received in and seals both permeate tubes. The plug 91 is designed to allow the cartridges to be disposed in close proximity to each other in order to minimize the dead space therebetween which is of course not operational from a separation standpoint.

The RO cartridges 29a and 29b and NF cartridge 31 are carefully selected so as to accomplish the desired overall function of producing a stream of potable water from seawater or the like at relatively low pressure conditions, i.e. not greater than about 350 psig, so as to permit the use of pressure vessels, pumps, valves, piping, etc. having such moderate ratings and to avoid the cost of expensive seawater RO membranes. This substantially reduces not only initial capital costs but operating costs as well, compared to standard high pressure seawater desalination systems. RO elements or cartridges 29 are selected which are made from suitable semipermeable membranes of the polyamide composite membrane variety which are widely used and which may be of the general class disclosed in U.S. Pat. No. 4,277,344 to Cadotte wherein a thin film of polyamide is interfacially formed on a porous polysulfone support or the like that was in turn formed on a highly porous fibrous backing material. Typical RO membranes will reject more than 95% of dissolved salts, and preferably about 98% or more; more preferably, RO membranes are selected which reject at least about 99% of dissolved salts for a feed containing 2,000 total dissolved solids (TDS) when operated at a pressure in the range of about 150 to about 225 psig, while producing an aqueous permeate of at least about 30 gallons/square foot/day (GFD). There are a number of commercially available membranes meeting these characteristics which can be purchased either in sheet form or in finished spirally wound cartridges. Examples of such suitable RO membranes include those sold as LE by Dow-FilmTec, as Desal-11 by Desalination Systems, Inc., as ESPA by Hydranautics, as ULP by Fluid Systems, Inc. and as ACM by TriSep Corporation.

NF membranes are employed which are designed to selectively reject divalent ions, and the NF elements or cartridges which are used should reject a minimum of about 80%, preferably a minimum of about 90%, more preferably a minimum of about 95%, and most preferably a minimum of about 96% of the divalent ions in an aqueous feed containing about 2,000 ppm of magnesium sulfate and about 2,000 ppm of NaCl, when operated at a pressure of about 70 to 100 psig while producing a flux in the range of about 25–40 GFD. The NF membrane preferably also at least moderately (e.g. about 50 to 55%) reduces the monovalent ion content, and more preferably rejects at least about 60% of the NaCl of such a feed. There are some commercially available membranes meeting these characteristics which produce a divalent ion-depleted permeate and reject monovalent ions in amounts of 70% to 90% at fluxes between about 25 to 40 GFD; these can be purchased either in sheet form or in finished spirally wound cartridges. Examples of such suitable NF membranes are those sold as NF-55, NF-70 and as NF-90 by Dow-Film Tec, as DS-5 and DS-51 by Desalination Systems, Inc., as ESNA-400 by Hydranautics and as TFCS by Fluid Systems, Inc.

To promote an understanding of the overall system, an illustrative representative example is hereinafter described. For purposes of illustration, a pressure vessel 27 having an 8-inch interior diameter and a length of about 18.5 feet is used which will accommodate five separation cartridges, 40 inches in length. Three 8-inch diameter, 40-inch long RO cartridges 29 are connected in series using standard hollow connectors 90, and the right-hand cartridge is joined by a two-headed blind plug 91 to an 8-inch diameter NF element 31 which is also 40 inches in length and which is connected in series with another NF element (not shown) of the same size. Each RO element is fabricated from a polyamide composite membrane marketed as ESPA by Hydranautics, and such a typical 8-inch diameter, spirally wound cartridge of 40 inches in length contains about 400–440 sq. ft. of active semipermeable membrane area. Each NF cartridge 31 is fabricated from polyamide composite membrane sold as NF-70 by Dow-Film Tec, and such a spirally wound element with an 8-inch diameter and a length of 40 inches also typically contains about 400–440 sq. ft. of effective NF membrane. It is considered desirable to employ at least about 50% more square feet of RO membrane surface area than NF membrane surface area, and often it is preferable to employ at least about twice as much.

Seawater taken from the ocean off Southern California is used as the source 11 of aqueous feed, which contains about 35,000 TDS including about 4000 ppm of divalent ions. With the valve 17 open and the valve 67 closed, the pump 21 is operated so as to draw suction of the feed from the source 11 through the filters 13 and 15 and discharge it to the energy recovery pump 23, which in turn supplies the aqueous feed to the inlet 25 to the pressure vessel 27. The aqueous feed flows axially through the RO elements 29 and then enters the NF elements 31 where a major portion, e.g. at least about 40–45%, permeates through the NF membrane material; the remainder exits through the outlet 33 as a concentrate stream which flows in the line 39 back to the input side of the energy recovery pump wherein it drops in pressure while simultaneously boosting the pressure of the liquid discharge from the positive displacement pump 21.

Seawater having the aforementioned characteristics has an osmotic pressure of about 360 psig, and accordingly the positive displacement pump 21 is operated so that it and the booster pump 23 supply the liquid feed to the pressure vessel inlet 25 at a pressure of about 350 psig which is just below the level at which permeation through the RO membrane will occur, as a result of which there is no permeation through the RO element and thus no flow in the line 71 leading from the RO permeate outlet 37. Accordingly, the entire volume of the feed stream flows through the feed passageways of both RO elements 29 in scouring fashion before entering the NF elements 31.

The characteristics of the NF membrane are such that there is a very substantial permeate flow, creating a NF permeate stream which exits via the axially located outlet 35, while a first concentrate stream exits via the outlet 33. Under typical conditions, the permeate stream may constitute between about 40 and about 45% of the feed stream being pumped into the pressure vessel, and typically there has been rejection of at least about 95% of the divalent ions and at least about 50% of the monovalent ions. As earlier indicated, the first concentrate stream is directed back through the input side of the coupled turbine-type energy recovery pump 23 before it flows through the discharge line 41, which contains the flowmeter 43, back to the ocean.

The NF permeate flows through the line 45, through the open valve 47 and the flowmeter 49 to the inlet 51 to the holding tank where the NF permeate is collected and accumulates; the tank may, for example, be sized to hold at least about 150 gallons of liquid or at least as much as would normally be produced during about 10–15 minutes of operation. Operation in this fashion continues until the level of liquid in the holding tank 53 reaches a predetermined level that is indicative of a nearly full condition; this is sensed by the upper liquid level sensor 57 which sends a signal to the control panel 19. Upon receipt of such signal, the control panel closes the valves 17, 47 and 83, opens the valve 67 and actuates the auxiliary pump 63. As a result, the pump 21 now begins to pump NF permeate from the holding tank 53 to the inlet 25 of the pressure vessel.

The positive displacement pump 21 continues to operate essentially as before so that the liquid stream entering the pressure vessel 27 remains at about the same pressure, i.e. 350 psig. However, the change in TDS between the original seawater feed is substantial; the osmotic pressure of the NF permeate now being supplied is about 100 psig. As a result, there is now a very substantial permeate flow through the RO membrane material of the coupled RO elements 29 which produces good quality potable water that flows spirally inward to the hollow tubes 89 and exits via the outlet 37 through the left-hand end closure 87 of the pressure vessel. The remainder of the pumped NF permeate constitutes a second concentrate stream which flows axially through feed passageways of the NF elements 31. Because the control panel 19 has closed the valve 47, no permeate flow can occur in the NF elements, and thus the entire second concentrate stream, which was previously depleted of substantial amounts of scale-forming divalent ions, serves to excellently flush the feed passageways throughout the spirally wound NF elements 31. Under typical operating conditions, approximately 80 to 85 volume % of the NF permeate being pumped through the inlet 25 leading to the pressure vessel exits through the outlet 37 as RO permeate, with the remainder exiting as a second concentrate stream through the outlet 33 and then flowing through the line 39, the input side of the energy recovery pump 23, and the discharge line 41, through which this stream is returned to the ocean.

The RO permeate in the line 71 flows through the conductivity sensor 73 to the tee 75, and typically the salt rejection effected by the RO membranes will be at least about 98% and more preferably about 99% or greater. Assuming the conductivity is within acceptable limits, which is an indication of good quality purified water, the RO permeate flows in the line 79, through the open valve 83 and the flowmeter 85, to a point of use or other desired collection vessel. Should, for whatever reason, the quality of the RO permeate temporarily deteriorate, such is detected by the sensor 73 as an increase in the electrical conductivity of the flowing stream; this would cause the control panel 19 to light an indicator light, close the valve 83 and open the valve 81, so as to return the RO permeate to the holding tank 53 where it will mix with the reservoir of NF permeate remaining in the tank and subsequently be subjected to a second pass through the RO elements. When the water quality returns to within acceptable limits, such is similarly sensed, causing the control panel to open valve 83 and close valve 81. The system continues to operate in this manner until the level of liquid in the holding tank 53 drops to a predetermined level indicating a near empty condition, which is sensed by the lower liquid level sensor 59. When this occurs, the control panel 19 closes the valve 67, opens the valves 17 and 47 and turns off the pump 63, thus returning the system to the original, earlier-described operating conditions where the seawater feed is being supplied to the pressure vessel 27 under conditions where there will be no permeate flow in the RO elements 29 and a stream of NF permeate is generated that will refill the holding tank 53.

Overall, it can be seen that capital costs are significantly reduced because operating pressures are about one-half to about two-thirds of those used in conventional seawater desalinization systems and because it is feasible to use a single pressure vessel of lower cost (because it need only be rated for a pressure of about 350 psig or below). Moreover, power costs are lower because the operating pressure is lower than that required for conventional seawater RO desalinization installations, even taking into account the fact that additional pumping is needed to achieve multiple passes through the pressure vessel. A very significant advantage lies in lower maintenance costs because of the increase in membrane lifetime and decrease in cleaning that is necessary. This results in part from the fact that, during the initial stage when NF permeate is being created, the RO elements are being flushed with the entire volume of the feed water being pumped. Perhaps even more important is the fact that, during the second stage of operation, the liquid (NF permeate) being pumped through the pressure vessel has been greatly depleted in potential scale-forming divalent ions so that the tendency to scale and clog the RO membranes is greatly reduced. Moreover, because there is no permeation through the NF membranes during such periods, the action within the NF element is purely one of flushing the NF element feed passageway which very effectively scours the feed surfaces of the NF membranes. Although the overall recovery of potable water may be in the range of about 26 to 30% of the initial pumped feed of seawater (compared to about 40–45% recoveries from high pressure, seawater RO units) such is outweighed by reduction in membrane fouling and the potential cost of anti-scaling chemicals and by the prolongation of membrane lifetimes.

In summary, it can be seen that the illustrated system provides an extremely efficient and economical method of desalinating seawater or any comparable aqueous feed containing substantial quantities of both divalent and monovalent salts to produce good quality potable water. Particular advantages lie in being able to operate both stages of the separation at about the same pressure in the range of about 250 psig to about 350 psig; this permits the use of a single main pump, which along with its associated valves and piping need to be designed for pressures no higher than about 350 psig so that expensive high pressure constructions are not required. Moreover, once the appropriate pressure at which the filtered seawater feed can be pumped to the pressure vessel without causing permeation through the RO membranes is determined, as a part of a start-up, the system can be operated automatically for extended periods of time until such time as the monitoring by the control system 19 of the flowmeters and/or the sensor 73 would indicate that deterioration has occurred somewhere so as to require adjustments. Moreover, the inclusion of 1.5 to 2 times as much RO membrane surface area as NF surface area has proved to create surprisingly efficient overall operating performance for such a system within a single pressure vessel.

Although the invention has been described with regard to certain preferred embodiments which constitute the best mode presently known to the inventor, it should be understood that various modifications and changes as would be obvious to one having the ordinary skill in the art may be made without departing from the scope of the invention which is set forth in the claims appended hereto. For example, as indicated hereinbefore, RO elements either of the HFF or the spirally wound type may be employed that use semipermeable membranes which will exhibit no permeate flow when exposed to seawater but which will provide a high rate of permeate flow of potable water when supplied with an appropriate NF permeate because of the lower osmotic pressure of such NF permeate. Likewise, any of a variety of commercially available NF membranes can be used; generally the NF membranes are selected with respect to a balance of flux, substantial divalent ion rejection and moderate monovalent rejection to provide optimum results with a particular feed. On the other hand, because there is ample driving pressure during the first stage operation when the NF permeate is being generated, it may be desirable to choose a NF membrane exhibiting a particularly high divalent ion rejection, i.e. about 95%.

Although the illustrated relationship is preferred, it might be feasible to place the NF element upstream of the RO elements in the pressure vessel. It would be recognized that, as a result of such relocation, there would be a lesser volume of flushing flow of liquid through the RO element feed passageways during the first stage of the operation; however, this would be balanced in the overall scheme by the creation of a greater flushing flow of liquid through the NF element feed passageways during the second stage operation when permeation through the RO membranes is occurring. Although from a simplicity standpoint and from a control standpoint it may be preferable to operate both stages so that the liquid entering the pressure vessel is at about the same inlet pressure, if desired, a somewhat lower pressure could be used during the initial stage because NF membranes traditionally can be operated at lower pressures, and such operation at even lower pressure could result in lower power usage which might be of advantage if power costs in a particular location were an important consideration. The disclosures of all U.S. patents enumerated herein are expressly incorporated by reference.

Particular features of the invention are emphasized in the claims which follow.

What is claimed is:

1. A method of producing potable water by desalinating an aqueous feed of seawater which contains high concentrations of monovalent and divalent ions comprising the steps of:

locating a reverse osmosis element (RO) and a nanofiltration (NF) element for series flow in a single pressure vessel having an inlet and a concentrate outlet;

pumping an aqueous feed containing monovalent ions and divalent ions in series flow through the RO and NF elements in said pressure vessel at a pressure which is below seawater's osmotic pressure so that substantially no permeation occurs through said RO element, but which is such that said NF element creates a first concentrate stream and a NF permeate stream having a highly reduced concentration of divalent ions and also a reduced concentration of monovalent ions;

collecting and temporarily storing said NF permeate stream in a reservoir; and interrupting said pumping of said aqueous feed and instead pumping said temporarily stored NF permeate from the reservoir through said pressure vessel inlet at a pressure above said NF permeate's osmotic pressure while blocking permeate flow within said NF element so that said second concentrate stream from said RO element only flushes feed passageways within said NF element while causing permeation to occur through said RO element which creates an RO permeate stream of potable water and a second concentrate stream.

2. The method of claim 1 wherein said RO element is located upstream of said NF element in said pressure vessel.

3. The method of claim 1 wherein the same pump is used to alternately supply either said aqueous feed or said temporarily stored NF permeate to said pressure vessel at about the same pressure, which pressure is not greater than about 350 psig.

4. The method of claim 1 further including the step of recovering energy from said first and second concentrate streams and using said energy to assist in said pumping.

5. The method of claim 1 wherein said pumping of said aqueous feed is interrupted automatically when said NF permeate being temporarily stored reaches a predetermined level in the reservoir.

6. The method of claim 1 wherein said RO element includes sheetlike membrane which rejects at least about 98% of dissolved salt from a feed containing about 2,000 TDS at a pressure between about 150 and 225 psig and which provides a flow rate of at least about 30 gallons per square foot per day and wherein said NF element is formed with sheetlike membrane which rejects at least about 95% of divalent ions and at least about 50% of monovalent ions in an aqueous feed containing about 2,000 ppm of magnesium sulfate and about 2,000 ppm of sodium chloride at a pressure of about 70 to about 100 psig and which provides a flow rate of at least about 25 gallons per square foot per day.

7. The method of claim 6 wherein the amount of RO membrane surface area within said pressure vessel is at least about 1.5 times the amount of the NF membrane surface area.

8. A method of desalinating seawater comprising the steps of:
  locating a reverse osmosis (RO) element upstream of a nanofiltration (NF) element for series flow in a single pressure vessel having an inlet and a concentrate outlet;
  pumping a seawater feed containing monovalent ions and divalent ions in series flow through the RO element and then through the NF element in said pressure vessel at a pressure which is below the osmotic pressure of seawater so that substantially no permeation occurs through the RO element, but which is such that the NF element creates a first concentrate stream and a NF permeate stream having a highly reduced concentration of divalent ions and also a reduced concentration of monovalent ions;
  collecting and temporarily storing said NF permeate stream; and
  interrupting said pumping of said seawater feed and instead pumping said temporarily stored NF permeate through said pressure vessel inlet at a pressure above said NF permeate's osmotic pressure to cause permeation to occur through the RO element while blocking permeate flow within the NF element which creates an RO permeate stream of potable water and a second concentrate stream the entire volume of which flushes the feed side of the NF element.

9. The method of claim 8 wherein the RO element and the NF element are spirally wound membrane elements.

10. The method of claim 9 wherein said RO element includes membrane which rejects at least about 98% of dissolved salt from a feed containing about 2,000 TDS at a pressure between about 150 and 225 psig and which provides a flow rate of at least about 30 gallons per square foot per day and wherein said NF element is formed with membrane which rejects at least about 95% of divalent ions and at least about 50% of monovalent ions in an aqueous feed containing about 2,000 ppm of magnesium sulfate and about 2,000 ppm of sodium chloride at a pressure of about 70 to about 100 psig and which provides a flow rate of at least about 25 gallons per square foot per day, and wherein the amount of RO membrane surface area within said pressure vessel is at least about twice the amount of the NF membrane surface area.

11. The method of claim 10 wherein the same pump is used to alternately pump either said seawater feed or said temporarily stored NF permeate through the pressure vessel, and wherein both are supplied to the pressure vessel at about the same pressure, which is between about 250 psig and about 350 psig.

12. Apparatus for producing potable water from an aqueous feed containing high concentrations of monovalent and divalent ions, which apparatus comprises:
  a pressure vessel having inlet and outlet ends and containing at least one nanofiltration (NF) element, which selectively rejects divalent ions, and at least one reverse osmosis (RO) element located upstream of said NF element, which rejects a high percentage of monovalent and divalent ions;
  said RO element including a membrane which rejects at least about 98% of dissolved salt from a feed containing about 2,000 TDS at a pressure between about 150 and 225 psig and provides a flow rate of at least about 30 gallons per square foot per day and said NF element being formed with membrane which rejects at least about 95% of divalent ions and about 50 to 55% of monovalent ions in an aqueous feed containing about 2,000 ppm of magnesium sulfate and about 2,000 ppm of sodium chloride at a pressure of about 70 to about 100 psig and provides a flow rate of at least about 25 gallons per square foot per day;
  energy recovery pumping means;
  a pump for delivering the aqueous feed through said energy recovery pumping means to said inlet end of said pressure vessel at a pressure below that at which permeation occurs through said RO element;
  means connecting said pump to a source of said aqueous feed so as to cause flow thereof through said pressure vessel sequentially first to said RO element and then to said NF element, whereby said NF element separates said aqueous feed into a first concentrate stream and an NF permeate stream which is substantially reduced in divalent ion content;
  an intermediate liquid storage tank;
  means for directing said NF permeate stream to said intermediate storage tank;
  means for
    (a) interrupting the flow of said aqueous feed from the source;
    (b) connecting said pump so as to draw liquid from said intermediate storage tank and thus pump said NF permeate back through said pressure vessel, and
    (c) blocking permeate flow within said NF element when said pump draws liquid from said intermediate storage tank,
      so that said pumped flow of said NF permeate from said intermediate storage tank through said pressure vessel flushes said NF element and results in said RO element separating said NF permeate into a potable water permeate stream and a second concentrate stream; and
  means for directing each said concentrate stream exiting said pressure vessel to said energy recovery pumping means to power same.

13. The apparatus of claim 12 wherein said NF element is a spirally wound membrane cartridge so that said pump causes flushing flow of NF permeate from said intermediate storage tank axially through spiral feed passageways within said NF element during the time that flow from the source is interrupted.

14. The apparatus of claim 13 wherein said RO element is a spirally wound membrane cartridge, wherein said cartridges include central porous permeate collection tubes, wherein plug means is provided to align said cartridges coaxially within said pressure vessel while blocking any flow between said collection tubes, and wherein said pump means is designed to operate at a pressure up to about 350 psig.

15. The apparatus of claim 12 wherein said intermediate liquid storage tank has a capacity at least large enough to hold a quantity of said NF permeate that would normally be produced during operation for at least 10 minutes of pumped flow of the aqueous feed through said pressure vessel.

16. The apparatus of claim 15 further including control means for instigating the interruption of the flow of the aqueous feed when said NF permeate reaches a predetermined liquid level in said tank and for connecting said pump means to supply said NF permeate to said pressure vessel inlet until the level in said tank decreases to a second lower predetermined level.

17. The apparatus of claim 16 wherein said RO and NF elements are spirally wound cartridges and wherein the total amount of RO membrane surface area within said pressure vessel is at least about 1.5 times the amount of NF membrane surface area therewithin.

* * * * *